Sept. 18, 1962     T. A. PETIX ETAL     3,054,499
CONVEYORS
Filed July 30, 1956     2 Sheets-Sheet 1
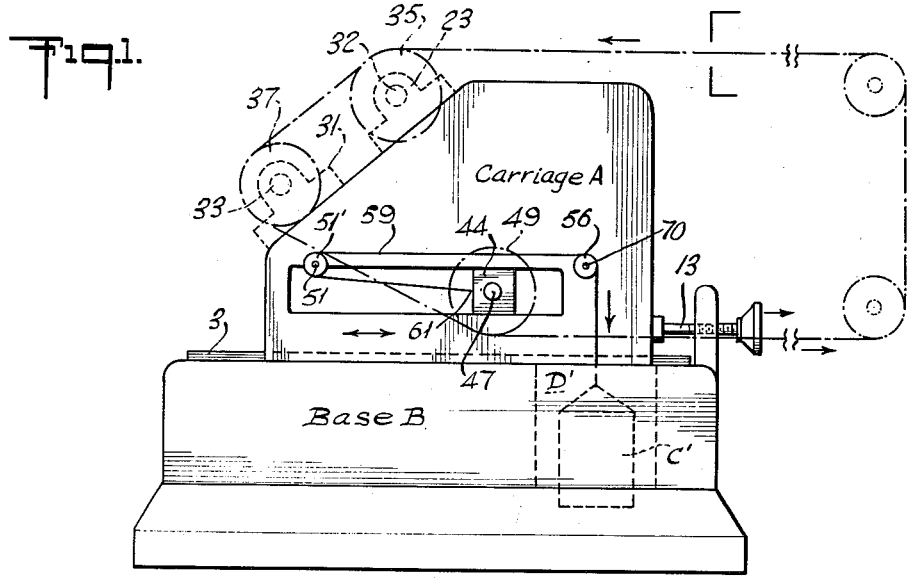
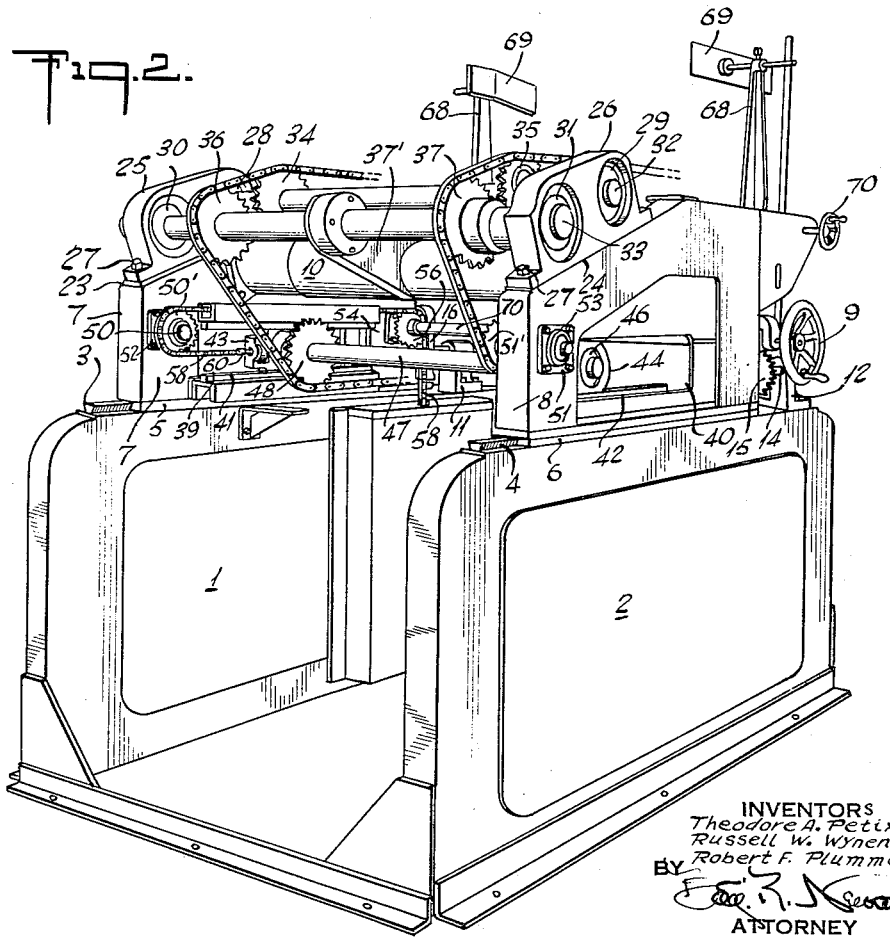
INVENTORS
Theodore A. Petix
Russell W. Wynen
Robert F. Plummer
BY
ATTORNEY Sept. 18, 1962     T. A. PETIX ETAL     3,054,499
CONVEYORS
Filed July 30, 1956     2 Sheets-Sheet 2
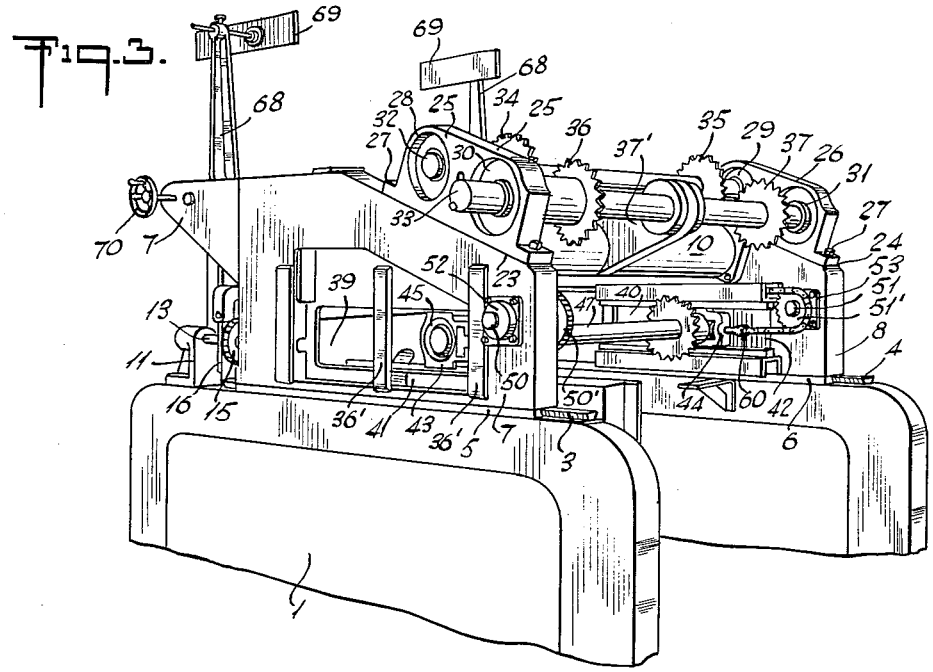
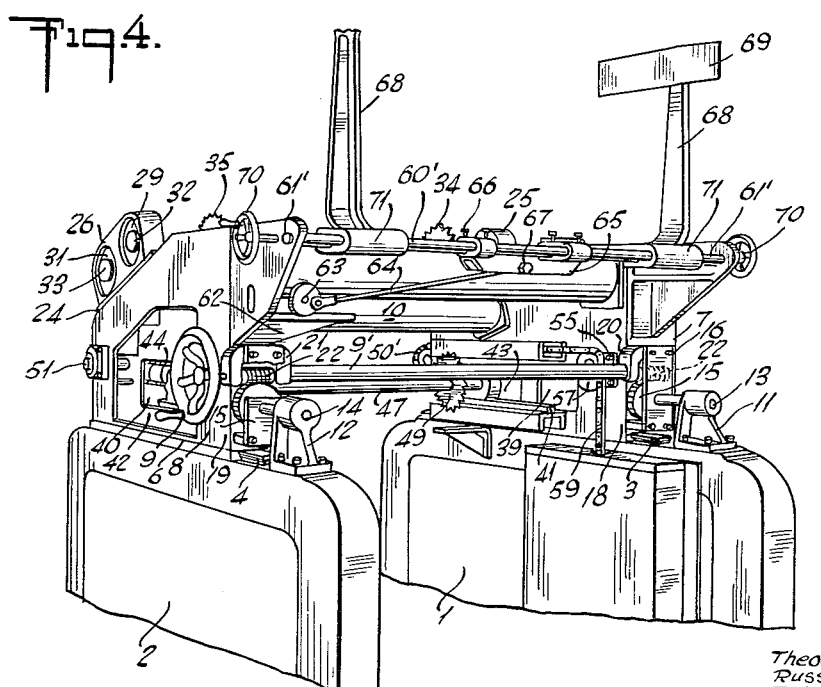
INVENTORS
Theodore A. Petix
Russell W. Wynen
Robert F. Plummer
BY
ATTORNEY United States Patent Office
3,054,499
Patented Sept. 18, 1962

3,054,499
CONVEYORS
Theodore A. Petix, New Hyde Park, and Russell W. Wynen, Queens Village, N.Y., and Robert F. Plummer, Edison, N.J., assignors to Midland-Ross Corporation, New York, N.Y., a corporation of Ohio
Filed July 30, 1956, Ser. No. 600,839
9 Claims. (Cl. 198—208)

This invention is a conveyor, a typical embodiment of which may be a chain flight conveyor operating through a heated zone, such as a straight pass oven, through which the conveyor moves racks, frames, wickets or clips, which, in turn, may transport pieces to be processed as, for instance, lithographed or coated sheets of metal, articles to be heat treated, enamel dried, or any of a number of other process steps which may include the necessity of lineally conveying material, or pieces, or parts, from one location to another remote therefrom in either a continuous or step by step motion; or the invention may comprehend a chain drive in which there may be the necessity for both a fixed and a varying adjustment depending upon loading, expansion, wear, or all three as in the present instance to be hereafter described.

In conveyor installations of the type to which this invention may normally apply there are usually two or more parallel endless chain flights traveling over sprockets, and between which there are carrying devices supporting the goods to be processed; in a lithographing oven, for instance, it may be sheets of metal supported on wickets secured at each side to the parallel chains; these ovens, and attendant conveyors, are not infrequently 150 or more feet in length which may mean that the combined upper and lower runs of chain on each side of the conveyor are of the order of 300 feet, thus it is obvious normal loading stretch plus wear in use may require some system by which permanent adjustment is to be accomplished and, also, the situation with a heated conveyor demands a second system of adjustment, not incompatible with the first, whereby expansion and contraction may be accommodated without effecting the drive adjustment during the heating up and cooling down periods. In view of the foregoing the necessity for integrated adjustment systems is apparent, and such a combination of devices is comprehended in this present invention.

Therefore, the present invention also has, among its several objectives, a multiple take up combination in which there are two independently adjustable systems one to accommodate the normal cold conveyor loading and wear adjustment to maintain the mechanism of the drive in workable and running adjustment, and a second system, of a floating type, compensating for the lengthening and shortening of the flight due to operating conditions such as heating and cooling.

Another objective is a conveyor drive which is so incorporated with the adjustments that static or running adjustments are possible without imposing anything more than the normal operating load on the prime mover.

It is also to be noted that the mechanics of this invention are equally applicable to the driven movement of a continuous belt of stainless steel, canvas, rubber or other material.

A further feature is an automatic jogger mechanism arranging the transported articles, such as lithographed steel sheets, into adjusted positions for uniform removal from the conveying means when they reach the conveyor discharge after being processed.

In the accompanying drawings illustrating the invention:

FIGURE 1 is a diagrammatic view of the combined adjustment mechanisms.

FIGURE 2 is a perspective view of the driving and multiple take up unit from the discharge end of the conveyor as diagrammed in FIGURE 1, and as viewed from the adjusting side.

FIGURE 3 is a view similar to FIGURE 2 as viewed from the driving side, but without the motor to more clearly show detail.

FIGURE 4 is a perspective view from the adjusting side, but from the opposite end to FIGURE 2.

In detail the upright frames 1 and 2 are in permanent parallel relation; they may be of hollow or box like cross section to accommodate rising and falling weight mechanism as will be hereinafter described. On their top surfaces are parallel longitudinally extending male dovetail members 3 and 4 which accommodate the lower dovetail guideways 5 and 6 of the travelling frames 7 and 8, respectively, carrying the take up and tension mechanism.

As has been stated in the introductory paragraphs delineating the features of this invention, the objectives are to overcome and control the several operating changes which may result from the combination of a heated oven or furnace with a moving flight of conveyor chain, either single or multiple, when the cold or non-operative characteristics of the conveyor flight are necessarily quite different from the hot or operating conditions and, at the same time, automatically compensate for wear or stretch of the single or multiple flight of chain providing the driving mechanism.

At the outset we have the condition in which, after the oven and its attendant conveyor have been assembled in operating relation, there must be some adjustment for tension to inaugurate operating conditions. The base frames 1 and 2 which are tied together by customary base stretchers are anchored to the floor or foundation by suitable tie bolts and entering the holes shown around the periphery of the frame at the bottom as indicated in FIGURES 2, 3, and 4. The upper parallel faces of frames 1 and 2 have, as above stated dovetail guides 3 and 4 secured thereto and which, in connection with these frames 1 and 2, are of sufficient area and strength to take the strains imposed by the driving load and tension on the conveyor flight plus its loaded condition when in operation and, also, the load of the compensating weights which, as will be later set out, keep the slack out of the conveyor flights when operating.

Movable lineally on the dovetails 3 and 4 are complementary dovetail guideways 5 and 6 on carriage side frames 7 and 8 respectively, carriage frame 7 being on the drive side and frame 8 on the operating side and from which side adjustments are made for the positioning of the carriage A with respect to the base frame B through the medium of the handwheel 9. The two carriage frames 7 and 8 are spanned by a reinforcing tubular stretcher 10 maintaining the parallel relationship of the carriage frames 7 and 8 at the upper portion of the carriage while the dovetails 3 and 4 perform this function at the lower portion.

On the base frames 1 and 2, at the forward end of the unit, are brackets 11 and 12 bored to receive threaded worm wheel shafts 13 and 14 carrying worm wheels 15 which are duplicates of one another and are confined between thrust plates 16 and 17 and the back faces 18 and 19 of the carriage frames 7 and 8. Suitable thrust bearings are provided between adjacent faces and hubs of worm wheels 15 and carriage frame faces 18 and 19; the hubs of worm wheels 15 constitute threaded nuts travelling on the threads of shafts 13 and 14 thus providing jacks so that when worm wheels 15 are turned the carriage frame A is moved lineally of the base B on the dovetails 3 and 4 and guideways 5 and 6. It is thus apparent that the carriage A is bodily movable on the base B; to accomplish this adjusting movement handwheel 9 is secured to the end of a cross shaft 9' journaled in the bifurcated bearings 20 and 21 on the carriage frames 7 and 8 and confined in the openings established by the bifurcated bearings are worms 22 meshing with worm wheels 15 and each keyed to the shaft 9' to which the handwheel 9 is likewise keyed. Therefore, turning the handwheel 9 in one direction or the other, as may be required, advances or retracts the carriage A along the base B.

Portions of the upper faces of the carriage frames 7 and 8 are inclined to the rear, as shown at 23 and 24, and serve as mounting surfaces for duplex bearing members 25 and 26 secured in place by cap screws 27. In the anti-friction bearings 28 and 29 and 30 and 31 of these duplex bearing members 25 and 26 are transverse sprocket shafts 32 and 33 which have keyed thereto identical pairs of sprockets 34—35 and 36—37. The shaft 33 constitutes the drive shaft on the drive side of the carriage A, and welded uprights 36' serve to mount a bracket carrying a motor or other prime mover (not shown) which drives shaft 33 at the proper revolutions per minutes in the direction indicated by the arrow. For additional support of the drive shaft 33 a strut member or arm 37' spans the distance between drive shaft 33 and stretcher 10 and carries a bearing 38 which sustains the shaft 33 against bowing due to loading. The foregoing constitutes the drive and adjustment for normal unheated operation of the conveyor.

As the oven heats up the conveyor flights 300 feet or so in lengths of chain, for instance, begin to lengthen out beyond the dimension of the cold condition and to which adjusted cold condition the conveyor adjustment must return when the oven is eventually shut down. As the warming up to the maximum temperature would require successive hand adjustments and constant attention on the part of the operators, and would also cause serious damage if not taken care of both during warming up and cooling down, we have provided automatic means, outside the possibility of human error or judgment, to take up the chain slack caused by the heating of the oven and to readjust on cooling so that no damage may result from any inattention on the part of the operator. This adjustment may occur while the oven is in operation and while the conveyor flight is in motion and also while the conveyor is loaded for production, irrespective of the major adjustment for initial tension of the conveyor flight. Furthermore, while both systems of adjustment are independent of one another they are so integrated so that they are complementary, in a sense, and comprehend a fully automatic regulation that avoids the operator start up and shut down responsibilities so frequently the cause of serious damage through misjudgment or neglect on the part of the operator.

Looking at FIGURES 2, 3 and 4 of the drawings, it will be observed that the frames of carriage A are apertured, and that on the inside of the facing side of these carriage frames 7 and 8 are parallel ways 39 and 40 each having guides 41 and 42 constituting slide ways accommodating the crossheads 43 and 44 mounting bearings 45 and 46, respectively, in which a sprocket shaft 47 is journaled. This shaft carries keyed sprockets 48 and 49 corresponding in relative position to the pairs of sprockets on the drive shaft 33 and the idler shaft 32. Should it be found desirable to accommodate for chain stretch one or more of the sprockets on the shafts 32 and 47 may be free running or both sprockets on each of these shafts may be idlers.

The utilization of this feature may be dependent on the type of chain used and the distance between successive sprockets; with good roller chain not overloaded all sprockets could be tight or keyed to the shafts. From the description, it will be noted that the sprocket shaft 47 is lineally movable not only with respect to the carriage frame A, but also with respect to the base B and in both instances without affecting the drive shaft 33.

To accomplish this movement of the shaft 47 the carriage frame members 7 and 8 have stub shafts 50 and 51 mounted in bearings 52 and 53 behind the upper runs of the slide ways guiding the crossheads 43 and 44 positioning the sprocket shaft 47, and each of these stub shafts 50 and 51 have idler sprockets 50' and 51'. At the forward end of the unit, and in longitudinal alignment with the stub shaft 50 and 51, are a second set of bearings 54 and 55 which, however, instead of mounting only stub shafts, mount a full cross shaft 70 carrying sprockets 56 and 57 keyed thereto and in alignment with sprockets 50' and 51'. Chain lengths 58 and 59 are secured as at 60 to the rear ends of crossheads 43 and 44 by capstan screws or in any other suitably adjustable manner for cross lineup of the crossheads 43 and 44, these chains then pass around sprocket pairs 50'—56 and 51'—57 and their ends depend perpendicularly and carry suitable counter weights C—C', as shown, moving in chambers D—D' of the frames 1 and 2 of the base B. As the sprockets 56 and 57 are keyed to a single cross shaft 70 in fixed bearings 54 and 55 while sprockets 50' and 51' are idlers only it will be seen that, once adjusted, crossheads 43 and 44 and the shaft which they carry will always be in parallelism with drive shaft 33 and idler shaft 32 and that the counter weights C—C' will automatically move the crossheads 43 and 44 to adjust for any change in length of the conveyor flight chains as the flight chains warm up and lengthen out or cool down and shorten.

The diagrammatic representation in FIGURE 1 clearly shows the operation. For purposes of simplifying the description of the functioning of the multiple take up unit FIGURE 1 diagrammatically illustrates one side only it being understood that the other side is practically identical and since the oven and chain flights are well known in the art it is unnecessary to do more than indicate these in the most simple form.

Base B corresponds to frames 1 and 2 of the more detail figures while carriage A corresponds to carriage frames 7 and 8, the primary elements of the diagram bear numerals identifying them with their counterparts in FIGURES 2, 3 and 4. The combination of base B and carriage A constitute the adjustment by which the pre-set tension on the chain conveyor is accomplished since base B is immovably secured to the floor or foundation and carriage A is bodily moved lineally thereof by jackscrews 13. The carriage A being on the dovetails of base B is secured against anything but the lineal movement accomplished by the jackscrews. On the other hand the carriage A has additional adjusting means the movement of which may be added to or subtracted from the pre-set adjustment and this is made possible by the weighted cross heads 44 influenced through the medium of chain 59 carried around sprockets 51' and 56 and from which chain 59 hangs a weight C' sufficiently heavy to keep the sprocket 49 lineally movable to any adjustment required by slack created through heating up of the oven or by wear, or to take up any contraction when the oven cools down. It will thus be apparent these combined adjustments compensate for any conditions of wear or temperature in the operation of the conveyors and ovens and while we have described a specific embodiment it is obviously within the scope of the invention that such mechanical equivalents may be substituted as will provide the necessary integrated adjustments for both operating and starting conditions.

Now then, if sheets of metal are to be handled in the customary wickets of the usual lithographic operation for can making it may be necessary to jog these sheets before discharge from the wickets in order to secured proper registered piling, and to take care of this we provide an automatic but simple power jogging device which consists of a cross shaft 60' which is oscillated in bearings 61', 61' in the upper portions of frames 7 and 8 by means of a motor mounted on base 62 (the motor not being shown); this motor drives eccentric 63 linked as at 64 to the bracket 65 fixed to oscillating shaft 60' by the set screws or other means 66, the arm or link 64 being pivoted as at 67.

The upright jogger arms 68 have adjustable cheek pieces 69, as shown which may contact the sheets and move them to a registering position just prior to discharge. These arms 68 are also adjustable transversally on shaft 60 through hand wheels 70 at each side which are threaded into the bases 71 of the jogger uprights 68 in such manner as to move them along the shaft 60 to adjusted positions; the foregoing, however, is only one of a number of jogger mechanisms which may be employed with our invention.

We claim:

1. Supporting mechanism for an endless conveyor comprising a base, a carriage supported by and movable relative to said base, a conveyor, a rotary device journalled in said carriage for engaging and supporting a conveyor, bearings supported by and movable relative to said carriage, a second rotary device journalled in said bearings for engaging the conveyor, said conveyor being trained over said first and second rotary devices, and means urging said second rotary device to move relative to said carriage whereby slack in the conveyor may be taken up by movement of said second rotary device relative to said carriage independently of movement of said carriage relative to said base to maintain constant tension in said conveyor.

2. Supporting mechanism for an endless conveyor comprising a base, a conveyor, a carriage supported by and movable relative to said base, a first rotary device journalled in said carriage for engaging and supporting the conveyor, means to move said carriage relative to said base in a direction to take up slack in the conveyor, bearings supported by and movable relative to said carriage, a second rotary device journalled in said bearings for engaging the conveyor, said conveyor being trained over said first and second rotary devices, and means urging said second rotary device to move relative to said carriage whereby slack in the conveyor may be taken up by movement of said second rotary device relative to said carriage independently of movement of said carriage relative to said base to maintain constant tension in said conveyor.

3. Supporting a mechanism for an endless conveyor comprising a base, a conveyor, a carriage supported by and movable relative to said base, a rotary device journalled in said carriage for engaging and supporting the conveyor, bearings supported by and movable relative to said carriage, a second rotary device journalled in said bearings for engaging the conveyor, said conveyor being trained over said first and second rotary devices, and weights interconnected with said bearings tending to move said bearings and said second rotary device relative to said carriage in a direction tending to take up slack in the conveyor and maintain constant tension therein.

4. Supporting mechanism for an endless conveyor comprising a base, a conveyor, a carriage supported by and movable relative to said base, a first rotary device journalled in said carriage for engaging and supporting the conveyor, means to move said carriage relative to said base in a direction to take up slack in the conveyor, bearings supported by and movable relative to said carriage, a second rotary device journalled in said bearings for engaging the conveyor, said conveyor being trained over said first and second rotary devices, and weights interconnected with said bearings tending to move said bearings and said second rotary device relative to said carriage in a direction tending to take up slack in the conveyor and maintain constant tension therein.

5. In an endless conveyor machine, a base, an endless chain, a first sprocket wheel for supporting said chain at one end of a portion of travel of said chain, a carriage supported by and movable relative to said base on which said first sprocket is journalled, bearings slidably mounted on said carriage, a second sprocket wheel journalled on said bearings, said endless chain trained over said first and second sprocket wheels, and means urging said bearings to slide relative to said carriage and thus cause said second sprocket wheel to engage and deflect said chain in a direction to take up slack in said chain and maintain constant tension therein.

6. In an endless conveyor machine, a base, an endless chain, a first sprocket wheel for supporting said chain at one end of a portion of travel of said chain, a carriage supported by and movable relative to said base on which said first sprocket is journalled, bearings slidably mounted on said carriage, a second sprocket wheel journalled on said bearings, said endless chain trained over said first and second sprocket wheels, and a suspended weight attached to said bearings to urge said bearings to slide relative to said carriage and thus cause said second sprocket wheel to engage and deflect said chain in a direction to take up slack in said chain and maintain constant tension therein.

7. In an endless conveyor machine, a base, an endless chain, a first sprocket wheel for supporting said chain at one end of a portion of travel of said chain, a carriage supported by and movable relative to said base on which said first sprocket is journalled, adjusting means to move said carriage in a direction to take up slack in said chain, bearings slidably mounted on said carriage, a second sprocket wheel journalled on said bearings, said endless belt trained over said first and second sprocket wheels, and means urging said bearings to slide relative to said carriage and thus cause said second sprocket wheel to engage and deflect said chain in a direction to take up slack in said chain and maintain constant tension therein.

8. Supporting mechanism for an endless conveyor, wherein said conveyor has an upper horizontal path of travel and a lower return path, comprising a carriage, a first rotary device journalled in said carriage for engaging and supporting said conveyor at one end of said upper horizontal path of travel, a second rotary device journalled in said carriage for engaging said conveyor at one end of said lower return path, a conveyor trained over both said first and second rotary devices, bearings slidably mounted on said carriage and journalled in one of said rotary devices, and means responsive to the occurrence of slack in said conveyor to cause said bearings and the rotary device journalled therein to move relative to said carriage in a direction to take up slack in said conveyor and maintain constant tension therein.

9. Supporting mechanism for an endless conveyor, wherein said conveyor has an upper horizontal path of travel and a lower return path, comprising a carriage, a first rotary device journalled in said carriage for engaging and supporting said conveyor at one end of said upper horizontal path of travel, a second rotary device journalled in said carriage for engaging said conveyor at one end of said lower return path, a conveyor trained over said first and second rotary devices, bearings slidably mounted on said carriage and journalled in said second rotary device, and a suspended weight attached to said bearings to urge said bearings and said second rotary device to slide relative to said carriage in a direction to take up slack in said conveyor and maintain constant tension therein.

References Cited in the file of this patent

UNITED STATES PATENTS

| | | |
|---|---|---|
| 395,883 | Dodge | Jan. 8, 1889 |
| 2,781,892 | Thevenieau | Feb. 19, 1957 |
| 2,883,037 | Lowe et al. | Apr. 21, 1959 |